US011871489B2

(12) United States Patent
Lewis et al.

(10) Patent No.: US 11,871,489 B2
(45) **Date of Patent: *Jan. 9, 2024**

(54) LIGHTING DEVICE HAVING AN INTERIM OPERABLE STATE

(71) Applicant: Lutron Technology Company LLC, Coopersburg, PA (US)

(72) Inventors: Jason E. Lewis, Driftwood, TX (US); Jivan J. Luu, Austin, TX (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/872,064

(22) Filed: Jul. 25, 2022

(65) Prior Publication Data

US 2022/0361301 A1 Nov. 10, 2022

Related U.S. Application Data

(63) Continuation of application No. 17/008,043, filed on Aug. 31, 2020, now Pat. No. 11,399,418, which is a (Continued)

(51) Int. Cl.
*H05B 45/12* (2020.01)
*H05B 45/14* (2020.01)
(Continued)

(52) U.S. Cl.
CPC ............ *H05B 45/12* (2020.01); *F21K 9/233* (2016.08); *F21V 7/06* (2013.01); *H05B 45/14* (2020.01);
(Continued)

(58) Field of Classification Search
CPC ........ H05B 45/12; H05B 45/14; H05B 45/50; H05B 45/59; H05B 45/22; H05B 45/24;
(Continued)

(56) References Cited

U.S. PATENT DOCUMENTS

| | | | |
|---|---|---|---|
| 9,332,598 | B1 | 5/2016 | Ho et al. |
| 9,392,660 | B2 | 7/2016 | Dias et al. |

(Continued)

*Primary Examiner* — Minh D A

(74) *Attorney, Agent, or Firm* — Michael S. Czarnecki; Glen R. Farbanish; Philip N. Smith

(57) ABSTRACT

A lighting device, such as a light-emitting diode (LED) light source, may operate in an interim operable state to avoid and/or prevent undesirable characteristics in the light emitted by the lighting device (e.g., strobing and/or flickering of a brightness of the light and/or shifting or change of a color of the light). When operating in a normal state, the control circuit may determine if a measured value of a first operational characteristic (e.g., a forward voltage of an emitter of the lighting device) is outside of a range and operate in the interim operable state if the measured value of the first operational characteristic is outside of the range. When operating in the interim operable state, the control circuit
(Continued)

may adjust a drive current for the emitter in response to a measured value of a second operational characteristic (e.g., a forward voltage of a detector of the lighting device).

21 Claims, 6 Drawing Sheets

Related U.S. Application Data continuation of application No. 16/684,238, filed on Nov. 14, 2019, now Pat. No. 10,764,979.

(60) Provisional application No. 62/767,416, filed on Nov. 14, 2018.

(51) Int. Cl.

| | |
|---|---|
| ***F21V 7/06*** | (2006.01) |
| ***H05B 45/50*** | (2022.01) |
| ***F21K 9/233*** | (2016.01) |
| ***H05B 45/59*** | (2022.01) |
| *F21Y 115/10* | (2016.01) |

(52) U.S. Cl.
CPC ............ *H05B 45/50* (2020.01); *H05B 45/59* (2022.01); *F21Y 2115/10* (2016.08)

(58) Field of Classification Search
CPC ........ F21K 9/233; F21V 7/06; F21V 23/0457; F21Y 2115/10; F21Y 2113/13
See application file for complete search history.

(56) References Cited

U.S. PATENT DOCUMENTS

| | | | | |
|---|---|---|---|---|
| 9,392,663 | B2 | 7/2016 | Knapp et al. | |
| 9,485,813 | B1 | 11/2016 | Lewis et al. | |
| 9,538,619 | B2 | 1/2017 | Swatsky et al. | |
| 9,578,724 | B1 | 2/2017 | Knapp et al. | |
| 9,736,895 | B1 | 8/2017 | Dong et al. | |
| 9,769,899 | B2 | 9/2017 | Ho et al. | |
| 10,764,979 | B1 * | 9/2020 | Lewis | F21K 9/233 |
| 11,399,418 | B2 * | 7/2022 | Lewis | H05B 45/14 |
| 2005/0264971 | A1 | 12/2005 | Morino | |
| 2011/0254554 | A1 | 10/2011 | Harbers | |
| 2015/0377695 | A1 | 12/2015 | Chang et al. | |
| 2016/0073467 | A1 | 3/2016 | McDonald et al. | |
| 2018/0160491 | A1 | 6/2018 | Biery et al. | |

* cited by examiner

LIGHTING DEVICE HAVING AN INTERIM OPERABLE STATE

CROSS-REFERENCE TO RELATED APPLICATIONS

This application is a continuation of U.S. application Ser. No. 17/008,043 filed Aug. 31, 2020; which is a continuation of U.S. application Ser. No. 16/684,238, filed Nov. 14, 2019, now U.S. Pat. No. 10,764,979 issued Sep. 1, 2020; which claims the benefit of U.S. Provisional Patent Application No. 62/767,416, filed Nov. 14, 2018. Each of the above are incorporated by reference herein in their entireties.

BACKGROUND

Lamps and displays using efficient light sources, such as light-emitting diode (LED) light sources, for illumination are becoming increasingly popular in many different markets. LED light sources provide a number of advantages over traditional light sources, such as incandescent and fluorescent lamps. For example, LED light sources may have a lower power consumption and a longer lifetime than traditional light sources. In addition, the LED light sources may have no hazardous materials, and may provide additional specific advantages for different applications. When used for general illumination, LED light sources provide the opportunity to adjust the color (e.g., from white, to blue, to green, etc.) or the color temperature (e.g., from warm white to cool white) of the light emitted from the LED light sources to produce different lighting effects.

A multi-colored LED illumination device may have two or more different colors of LED emission devices (e.g., LED emitters) that are combined within the same package to produce light (e.g., white or near-white light). There are many different types of white light LED light sources on the market, some of which combine red, green, and blue (RGB) LED emitters; red, green, blue, and yellow (RGBY) LED emitters; phosphor-converted white and red (WR) LED emitters; red, green, blue, and white (RGBW) LED emitters, etc. By combining different colors of LED emitters within the same package, and driving the differently-colored emitters with different drive currents, these multi-colored LED illumination devices may generate white or near-white light within a wide gamut of color points or correlated color temperatures (CCTs) ranging from warm white (e.g., approximately 2600K-3700K), to neutral white (e.g., approximately 3700K-5000K) to cool white (e.g., approximately 5000K-8300K). Some multi-colored LED illumination devices also may enable the brightness (e.g., intensity or dimming level) and/or color of the illumination to be changed to a particular set point. These tunable illumination devices may all produce the same color and color rendering index (CRI) when set to a particular dimming level and chromaticity setting (e.g., color set point) on a standardized chromaticity diagram.

SUMMARY

As described herein, a lighting device, such as a light-emitting diode (LED) light source, may operate in an interim operable state to avoid and/or prevent undesirable characteristics in the light emitted by the lighting device (e.g., strobing and/or flickering of a brightness of the light and/or shifting or change of a color of the light). The lighting device may comprise an emitter configured to emit light and a control circuit configured to adjust a drive current for the emitter. The lighting device may also comprise a detector configured to generate a detector signal in response to detected light. The control circuit may adjust the drive current in response to a measured value of a first operational characteristic (e.g., a forward voltage of the emitter) when operating in a normal state. In addition, the control circuit may adjust the drive current in response to the detector signal (e.g., that indicates a luminous flux of the light emitted by the emitter).

When operating in the normal state, the control circuit may determine if the measured value of the first operational characteristic is outside of a range and operate in the interim operable state if the measured value of the first operational characteristic is outside of the range. When operating in the interim operable state, the control circuit may adjust the drive current for the emitter in response to a measured value of a second operational characteristic (e.g., a forward voltage of the detector). The control circuit may return to the normal state if a measured value of the first operational characteristic is within the range when operating in the interim operable state, and/or operate in an inoperable state if a measured value of the first operational characteristic is outside of the range when operating in the interim operable state. The control circuit may turn off the emitter when operating in the interim operable state.

DETAILED DESCRIPTION

Figure 1:
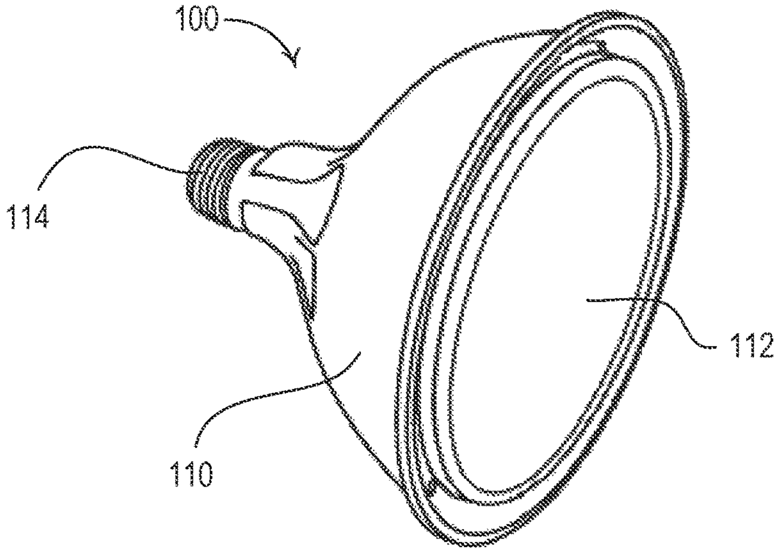
FIG. 1 is a simplified perspective view of an example light source.

FIG. 1 is a simplified perspective view of an example illumination device, such as a light source 100 (e.g., an LED light source). The light source 100 may have a parabolic form factor and may be a parabolic aluminized reflector (PAR) lamp. The light source 100 may include a housing 110 and a lens 112 (e.g., an exit lens), through which light from an internal lighting load (not shown) may shine. The lamp 100 may include a screw-in base 114 that may be configured to be screwed into a standard Edison socket for electrically coupling the lamp 100 to an alternating-current (AC) power source.

Figure 2:
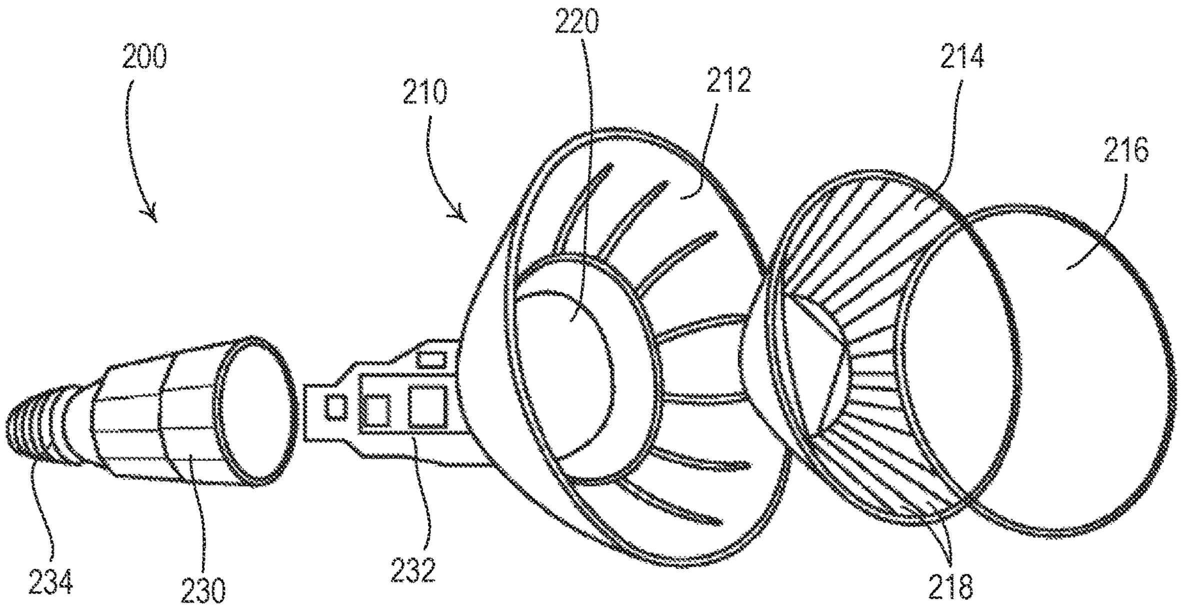
FIG. 2 is an exploded view of another example light source.

FIG. 2 is an exploded view of another example light source 200 (e.g., an LED light source) having a parabolic form factor (e.g., which may have a similar assembly as the light source 100 shown in FIG. 1). The light source 200 may comprise an emitter housing 210 that includes a heat sink 212, a reflector 214 (e.g., a parabolic reflector), and a lens 216 (e.g., an exit lens). The light source 200 may comprise a lighting load, such as an emitter module 220, that may include one or more emission light-emitting diodes (LEDs).

The emitter module 220 may be enclosed by the emitter housing 210 and may be configured to shine light through the lens 216. The lens 216 may be made of any suitable material, for example glass. The lens 216 may be transparent or translucent and may be flat or domed, for example. The reflector 214 may shape the light produced by the emission LEDs within the emitter module 220 into an output beam. The reflector 214 may comprise planar facets 218 (e.g., lunes) that may provide some randomization of the reflections of the light rays emitted by the emitter module 220 prior to exiting light source 200 through the lens 216. The lens 216 may comprises an array of lenslets (not shown) formed on both sides of the lens. An example of a light source having a lens with lenslets is described in greater detail in U.S. Pat. No. 9,736,895, issued Aug. 15, 2017, entitled COLOR MIXING OPTICS FOR LED ILLUMINATION DEVICE, the entire disclosure of which is hereby incorporated by reference.

The light source 200 may comprise a driver housing 230 that may be configured to house a driver printed circuit board (PCB) 232 on which the electrical circuitry of the light source may be mounted. The light source 200 may include a screw-in base 234 that may be configured to be screwed into a standard Edison socket for electrically coupling the light source to an alternating-current (AC) power source. The screw-in base 234 may be attached to the driver housing 230 and may be electrically coupled to the electrical circuitry mounted to the driver PCB 232. The driver PCB 232 may be electrically connected to the emitter module 220, and may comprise one or more drive circuits and/or one or more control circuits for controlling the amount of power delivered to the emitter LEDs of the emitter module 220. The driver PCB 232 and the emitter module 220 may be thermally connected to the heat sink 212.

Figure 3:
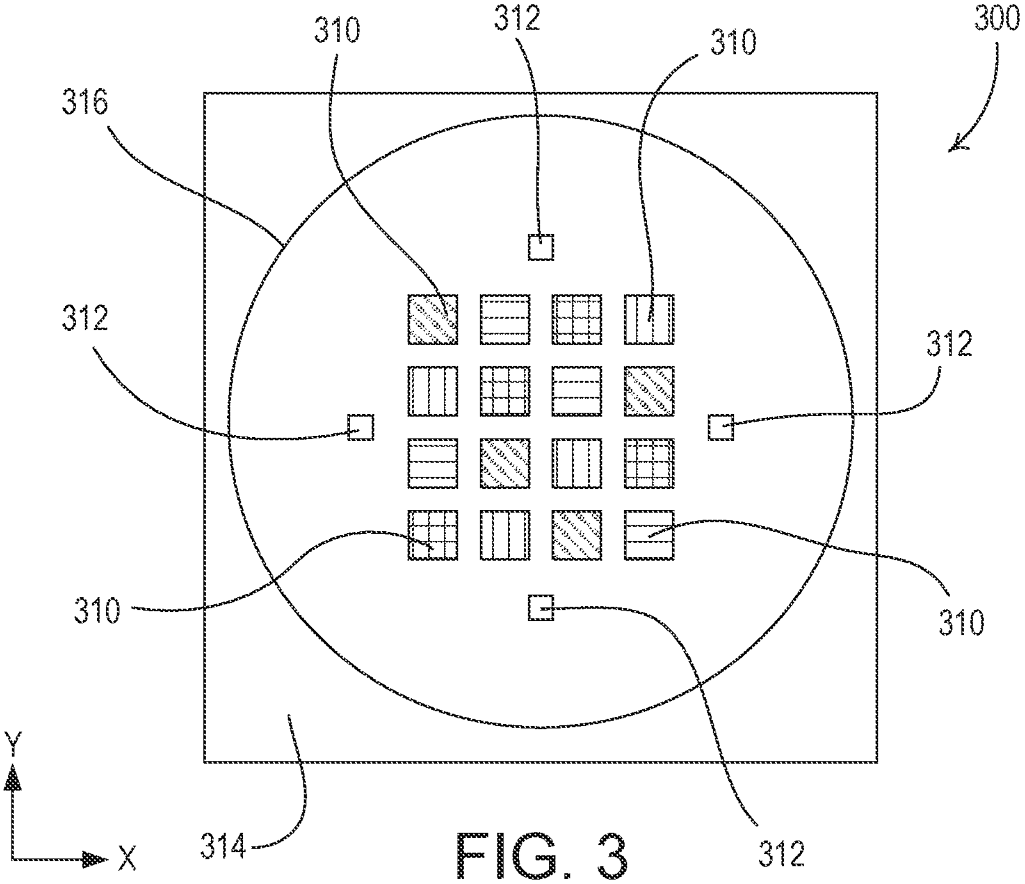
FIG. 3 is a top view of an example emitter module.

FIG. 3 is a top view of an example emitter module 300 (e.g., the emitter module 220 of the light source 200). The emitter module 300 may comprise an array of emitters 310 (e.g., emission LEDs) and detectors 312 (e.g., detection LEDs) mounted on a substrate 314 and encapsulated by a primary optics structure, such as a dome 316. For example, the emitter module 300 may comprise an array of sixteen emitters 310 and four detectors 312. The emitters 310, the detectors 312, the substrate 314, and the dome 316 may form an optical system. The emitters 310 may be arranged in a square array as close as possible together in the center of the dome 316, so as to approximate a centrally-located point source. The emitter module 300 may include multiple "chains" of emitters 310 (e.g., series-coupled emitters). The emitters 310 of each chain may be coupled in series and may conduct the same drive current. Each chain may include emitters 310 that produce illumination at a different peak emission wavelength (e.g., emit light of the same color). The emitters 310 of different chains may emit light of different colors. For example, the emitter module 300 may comprise four differently colored chains of emitters 310 (e.g., red, green, blue, and white or yellow). The array of emitters 310 may include a chain of four red emitters, a chain of four green emitters, a chain of four blue emitters, and a chain of four white or yellow emitters. The individual emitters 310 in each chain may be scattered about the array and arranged so that no color appears twice in any row, column, or diagonal, to improve color mixing within the emitter module 300.

The detectors 312 may be placed close to each edge of the array of emitters 310 and/or and in the middle of the array of emitters 310 and may be connected in parallel to a receiver of the illumination device. Similar to the emitters 310, the detectors 312 are LEDs that can be used to emit or receive optical or electrical signals. When the detectors 312 are coupled to receive optical signals and emit electrical signals, the detectors 312 may produce current indicative of incident light from, for example, an emitter, a plurality of emitters, or a chain of emitters. The detectors 312 may be any device that produces current indicative of incident light, such as a silicon photodiode or an LED. For example, the detectors 312 may each be an LED having a peak emission wavelength in the range of approximately 550 nm to 700 nm, such that the detectors 312 may not produce photocurrent in response to infrared light (e.g., to reduce interference from ambient light).

The substrate 314 of the emitter module 310 may be a ceramic substrate formed from an aluminum nitride or an aluminum oxide material or some other reflective material, and may function to improve output efficiency of the emitter module 300 by reflecting light out of the emitter module through the dome 316. The dome 316 may comprise an optically transmissive material, such as silicon or the like, and may be formed through an over-molding process, for example. A surface of the dome 316 may be lightly textured to increase light scattering and promote color mixing, as well as to reflect a small amount of the emitted light back toward the detectors 312 mounted on the substrate 314 (e.g., about 5%). The size of the dome 316 (e.g., a diameter of the dome in a plane of the emitters 310) may be generally dependent on the size of the array of emitters 310. The diameter of the dome may be substantially larger (e.g., about 1.5 to 4 times larger) than the diameter of the array of emitters 310 to prevent occurrences of total internal reflection.

Another form factor of a light source may be a linear form factor. A linear light source may include a number of the emitter modules (e.g., such as the emitter module 220, 300) spaced apart and arranged in a linear manner (e.g., in a line). Each emitter module in the linear light source may include a plurality of emitters and at least one dedicated detector, all of which may be mounted onto a common substrate and encapsulated within a primary optics structure. The primary optics structure may be formed from a variety of different materials and may have substantially any shape and/or dimensions necessary to mix the light emitted by the emitters in any desirable manner.

Figure 4:
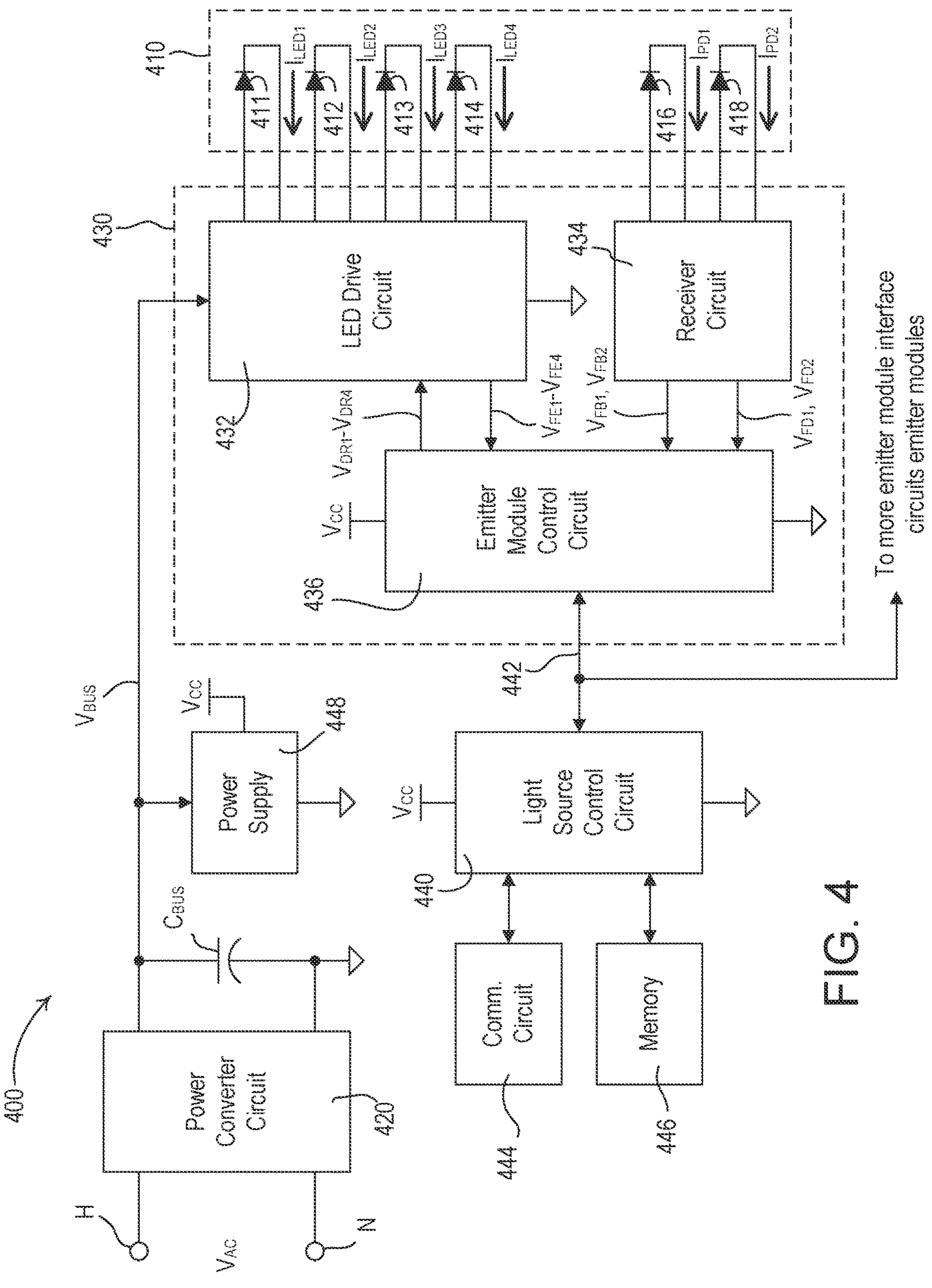
FIG. 4 is a simplified block diagram of an example lighting device.

FIG. 4 is a simplified block diagram of an example electrical device, such as a lighting device 400 (e.g., the light source 100 shown in FIG. 1 and/or the light source 200 shown in FIG. 2). The lighting device 400 may comprise one or more emitter modules 410 (e.g., the emitter module 300 shown in FIG. 3). For example, if the lighting device 400 is a PAR lamp (e.g., as shown in FIGS. 1 and 2), the lighting device comprise a single emitter module 410. The emitter module 410 may comprise one or more emitters 411, 412, 413, 414. Each emitter 411-414 is shown in FIG. 4 as a single LED, but may each comprise a plurality of LEDs connected in series (e.g., a chain of LEDs), a plurality of LEDs connected in parallel, or a suitable combination thereof, depending on the particular lighting system. In addition, each emitter 411-414 may comprise one or more organic light-emitting diodes (OLEDs). For example, the first emitter 411 may represent a chain of red LEDs, the second emitter 412 may represent a chain of blue LEDs, the third emitter 413 may represent a chain of green LEDs, and the fourth emitter 414 may represent a chain of white or amber LEDs. The emitters 411-414 may be controlled to adjust a brightness (e.g., a luminous flux or an intensity) and/or a color (e.g., a color temperature) of a cumulative light output of the lighting device 400. The emitter module

410 may also comprise one or more detectors 416, 418 (e.g., photodiodes, such as a red LED and a green LED) that may produce respective photodiode currents $I_{PD1}$, $I_{PD2}$ (e.g., detector signals) in response to incident light.

The lighting device 400 may comprise a power converter circuit 420, which may receive a source voltage, such as an AC mains line voltage $V_{AC}$, via a hot connection H and a neutral connection N, and generate a DC bus voltage $V_{BUS}$ (e.g., approximately 15-20V) across a bus capacitor $C_{BUS}$. The power converter circuit 420 may comprise, for example, a boost converter, a buck converter, a buck-boost converter, a flyback converter, a single-ended primary-inductance converter (SEPIC), a Ćuk converter, or any other suitable power converter circuit for generating an appropriate bus voltage. The power converter circuit 420 may provide electrical isolation between the AC power source and the emitters 411-414 and may operate as a power factor correction (PFC) circuit to adjust the power factor of the lighting device 400 towards a power factor of one.

The lighting device 400 may comprise one or more emitter module interface circuits 430 (e.g., one emitter module interface circuit per emitter module 410 in the lighting device 400). The emitter module interface circuit 430 may comprise an LED drive circuit 432 for controlling (e.g., individually controlling) the power delivered to and the luminous flux of the light emitted of each of the emitters 411-414 of the respective emitter module 410. The LED drive circuit 432 may receive the bus voltage $V_{BUS}$ and may adjust magnitudes of respective LED drive currents $I_{LED1}$, $I_{LED2}$, $I_{LED3}$, $I_{LED4}$ conducted through the LED light sources 411-414. The LED drive circuit 432 may comprise one or more regulation circuits (e.g., four regulation circuits), such as switching regulators (e.g., buck converters), for controlling the magnitudes of the respective LED drive currents $I_{LED1}$-$I_{LED4}$. An example of the LED drive circuit 432 is described in greater detail in U.S. Pat. No. 9,485,813, issued Nov. 1, 2016, entitled ILLUMINATION DEVICE AND METHOD FOR AVOIDING AN OVER-POWER OR OVER-CURRENT CONDITION IN A POWER CONVERTER, the entire disclosure of which is hereby incorporated by reference.

The emitter module interface circuit 430 may also comprise a receiver circuit 434 that may be electrically coupled to the detectors 416, 418 of the emitter module 410 for generating respective optical feedback signals $V_{FB1}$, $V_{FB2}$ in response to the photodiode currents $I_{PD1}$, $I_{PD2}$. The receiver circuit 434 may comprise one or more trans-impedance amplifiers (e.g., two trans-impedance amplifiers) for converting the respective photodiode currents $I_{PD1}$, $I_{PD2}$ into the optical feedback signals $V_{FB1}$, $V_{FB2}$. For example, the optical feedback signals $V_{FB1}$, $V_{FB2}$ may have DC magnitudes that indicate the magnitudes of the respective photodiode currents $I_{PD1}$, $I_{PD2}$.

The emitter module interface circuit 430 may also comprise an emitter module control circuit 436 for controlling the LED drive circuit 432 to control the intensities of the emitters 411-414 of the emitter module 410. The emitter module control circuit 436 may comprise, for example, a microprocessor, a microcontroller, a programmable logic device (PLD), an application specific integrated circuit (ASIC), a field-programmable gate array (FPGA), or any other suitable processing device or controller. The emitter module control circuit 436 may generate one or more drive signals $V_{DR1}$, $V_{DR2}$, $V_{DR3}$, $V_{DR4}$ for controlling the respective regulation circuits in the LED drive circuit 432. The emitter module control circuit 436 may receive the optical feedback signals $V_{FB1}$, $V_{FB2}$ from the receiver circuit 434 for determining the luminous flux $L_E$ of the light emitted by the emitters 411-414.

The emitter module control circuit 436 may also receive a plurality of emitter forward-voltage feedback signals $V_{FE1}$, $V_{FE2}$, $V_{FE3}$, $V_{FE4}$ from the LED drive circuit 432 and a plurality of detector forward-voltage feedback signals $V_{FD1}$, $V_{FD2}$ from the receiver circuit 434. The emitter forward-voltage feedback signals $V_{FE1}$-$V_{FE4}$ may be representative of the magnitudes of the forward voltages of the respective emitters 411-414, which may indicate temperatures $T_{E1}$, $T_{E2}$, $T_{E3}$, $T_E$A of the respective emitters. If each emitter 411-414 comprises multiple LEDs electrically coupled in series, the emitter forward-voltage feedback signals $V_{FE1}$-$V_{FE4}$ may be representative of the magnitude of the forward voltage across a single one of the LEDs or the cumulative forward voltage developed across multiple LEDs in the chain (e.g., all of the series-coupled LEDs in the chain). The detector forward-voltage feedback signals $V_{FD1}$, $V_{FD2}$ may be representative of the magnitudes of the forward voltages of the respective detectors 416, 418, which may indicate temperatures $T_{D1}$, $T_{D2}$ of the respective detectors. For example, the detector forward-voltage feedback signals $V_{FD1}$, $V_{FD2}$ may be equal to the forward voltages $V_{FD}$ of the respective detectors 416, 418.

The lighting device 400 may comprise a light source control circuit 440 that may be electrically coupled to the emitter module control circuit 436 of each of the one or more emitter module interface circuits 430 via a communication bus 442 (e.g., an $I^2C$ communication bus). The light source control circuit 440 may be configured to control the emitter modules 430 to control the brightness (e.g., the luminous flux) and/or the color (e.g., the color temperature) of the cumulative light emitted by the lighting device 400. The light source control circuit 440 may comprise, for example, a microprocessor, a microcontroller, a programmable logic device (PLD), an application specific integrated circuit (ASIC), a field-programmable gate array (FPGA), or any other suitable processing device or controller. The light source control circuit 440 may be configured to adjust (e.g., dim) a present intensity $L_{PRES}$ (e.g., a present brightness) of the cumulative light emitted by the lighting device 400 towards a target intensity $L_{TRGT}$ (e.g., a target brightness), which may range across a dimming range of the light source, e.g., between a low-end intensity $L_{LE}$ (e.g., a minimum intensity, such as approximately 0.1%-1.0%) and a high-end intensity $L_{HE}$ (e.g., a maximum intensity, such as approximately 100%). The light source control circuit 440 may be configured to adjust a present color temperature $T_{PRES}$ of the cumulative light emitted by the lighting device 400 towards a target color temperature $T_{TRGT}$, which may range between a cool-white color temperature (e.g., approximately 3100-4500 K) and a warm-white color temperature (e.g., approximately 2000-3000 K).

The lighting device 400 may comprise a communication circuit 444 coupled to the light source control circuit 440. The communication circuit 444 may comprise a wireless communication circuit, such as, for example, a radio-frequency (RF) transceiver coupled to an antenna for transmitting and/or receiving RF signals. The wireless communication circuit may be an RF transmitter for transmitting RF signals, an RF receiver for receiving RF signals, or an infrared (IR) transmitter and/or receiver for transmitting and/or receiving IR signals. The communication circuit 444 may be coupled to the hot connection H and the neutral connection N of the lighting device 400 for transmitting a control signal via the electrical wiring using, for example, a power-line carrier (PLC) communication technique. The light source control circuit 440 may be configured to determine the target intensity $L_{TRGT}$ for the lighting device 400 in response to messages (e.g., digital messages) received via the communication circuit 444.

The lighting device 400 may comprise a memory 446 configured to store operational characteristics of the lighting device 400 (e.g., the target intensity $L_{TRGT}$, the target color temperature $T_{TRGT}$, the low-end intensity $L_{LE}$, the high-end intensity $L_{HE}$, etc.). The memory 446 may be implemented as an external integrated circuit (IC) or as an internal circuit of the light source control circuit 440. The lighting device 400 may comprise a power supply 448 that may receive the bus voltage $V_{BUS}$ and generate a supply voltage $V_{CC}$ for powering the light source control circuit 440 and other low-voltage circuitry of the lighting device 400.

When the lighting device 400 is on, the light source control circuit 440 may be configured to control the emitter modules 410 to emit light substantially all of the time. The light source control circuit 440 may be configured to control the emitter modules 410 to disrupt the normal emission of light to measure one or more operational characteristics of the emitter modules during periodic measurement intervals. For example, during the measurement intervals, the emitter module control circuit 436 may be configured to individually turn on each of the different-colored emitters 411-414 of the emitter modules 410 (e.g., while turning off the other emitters) and measure the luminous flux of the light emitted by that emitter using one of the two detectors 416, 418. For example, the emitter module control circuit 436 may turn on the first emitter 411 of the emitter module 410 (e.g., at the same time as turning off the other emitters 412-414) and determine the luminous flux $L_E$ of the light emitted by the first emitter 411 in response to the first optical feedback signal $V_{FB1}$ generated from the first detector 416. In addition, the emitter module control circuit 436 may be configured to drive the emitters 411-414 and the detectors 416, 418 to generate the emitter forward-voltage feedback signals $V_{FE1}$-$V_{FE4}$ and the detector forward-voltage feedback signals $V_{FD1}$, $V_{FD2}$ during the measurement intervals.

Methods of measuring the operational characteristics of emitter modules in a light source are described in greater detail in U.S. Pat. No. 9,332,598, issued May 3, 2016, entitled INTERFERENCE-RESISTANT COMPENSATION FOR ILLUMINATION DEVICES HAVING MULTIPLE EMITTER MODULES; U.S. Pat. No. 9,392,660, issued Jul. 12, 2016, entitled LED ILLUMINATION DEVICE AND CALIBRATION METHOD FOR ACCURATELY CHARACTERIZING THE EMISSION LEDS AND PHOTODETECTOR(S) INCLUDED WITHIN THE LED ILLUMINATION DEVICE; and U.S. Pat. No. 9,392,663, issued Jul. 12, 2016, entitled ILLUMINATION DEVICE AND METHOD FOR CONTROLLING AN ILLUMINATION DEVICE OVER CHANGES IN DRIVE CURRENT AND TEMPERATURE, the entire disclosures of which are hereby incorporated by reference.

Calibration values for the various operational characteristics of the lighting device 400 may be stored in the memory 446 as part of a calibration procedure performed during manufacturing of the lighting device 400. Calibration values may be stored for each of the emitters 411-414 and/or the detectors 416, 418 of each of the emitter modules 410. For example, calibration values may be stored for measured values of luminous flux (e.g., in lumens), x-chromaticity, y-chromaticity, emitter forward voltage, photodiode current, and detector forward voltage. For example, the luminous flux, x-chromaticity, and y-chromaticity measurements may be obtained from the emitters 411-414 using an external calibration tool, such as a spectrophotometer. The values for the emitter forward voltages, photodiode currents, and detector forward voltages may be measured internally to the lighting device 400. The calibration values for each of the emitters 411-414 and/or the detectors 416, 418 may be measured at a plurality of different drive currents, e.g., at 100%, 30%, and 10% of a maximum drive current, for each respective emitter.

In addition, the calibration values for each of the emitters 411-414 and/or the detectors 416, 418 may be measured at a plurality of different operating temperatures. The lighting device 400 may be operated in an environment that is controlled to multiple calibration temperatures and values of the operational characteristics may be measured and stored. For example, the lighting device 400 may be operated at a cold calibration temperature, such as room temperature (e.g., approximately 25° C.), and a hot calibration temperature (e.g., approximately 85° C.). At each temperature, the calibration values for each of the emitters 411-414 and/or the detectors 416, 418 may be measured at each of the plurality of drive currents and stored in the memory 446.

After installation, the light source control circuit 440 of the lighting device 400 may use the calibration values stored in the memory 446 to maintain a constant light output from the emitter modules 410. The light source control circuit 440 may determine target values for the luminous flux to be emitted from the emitters 411-414 to achieve the target intensity $L_{TRGT}$ and/or the target color temperature $T_{TRGT}$ for the lighting device 400. The light source control circuit 440 may determine the magnitudes for the respective drive currents $I_{LED1}$-$I_{LED4}$ for the emitters 411-414 based on the determined target values for the luminous flux to be emitted from the emitters 411-414. When the age of the lighting device 400 is zero, the magnitudes of the respective drive currents $I_{LED1}$-$I_{LED4}$ for the emitters 411-414 may be controlled to initial magnitudes LED-INITIAL.

The light output of the emitter modules 410 may decrease as the emitters 411-414 age. The light source control circuit 440 may be configured to increase the magnitudes of the drive currents $I_{DR}$ for the emitters 411-414 to adjusted magnitudes $I_{LED\text{-}ADJUSTED}$ to achieve the determined target values for the luminous flux of the target intensity $L_{TRGT}$ and/or the target color temperature $T_{TRGT}$. Methods of adjusting the drive currents of emitters to achieve a constant light output as the emitters age are described in greater detail in U.S. Patent Application Publication No. 2015/0382422, published Dec. 31, 2015, entitled ILLUMINATION DEVICE AND AGE COMPENSATION METHOD, the entire disclosure of which is hereby incorporated by reference.

During a normal state of operation of the lighting device 400, the emitter module control circuit 436 may be configured to use closed-loop control to adjust the drive currents $I_{LED1}$-$I_{LED4}$ for the respective emitters 411-414 in response to the various feedback signals generated by the emitter module. Since the emitter module control circuit 436 is using closed-loop control, certain conditions may cause the light emitted by the lighting device 400 to exhibit undesirable characteristics. For example, failure of one or more of the emitters 411-414 may cause the brightness of the light to strobe or flicker and/or the color of the light to shift or change. To avoid or minimize undesirable behavior of the light output, the emitter module control circuit 436 may be configured to operate in an interim operable state in response to detecting that one or more of the measured operating characteristics of the lighting device 400 are out of an acceptable range. For example, the emitter module control circuit 436 may be configured to operate in the interim operable state in response to detecting out-of-range measurements of the luminous flux $L_E$ (e.g., as determined from the optical feedback signals $V_{FB1}$, $V_{FB2}$), the forward voltages of the emitters 411-414 (e.g., as determined from the emitter forward-voltage feedback signals $V_{FE1}$-$V_{FE4}$), and/or the forward voltages of the detectors 416, 418 (e.g., as determined from the detector forward-voltage feedback signals $V_{ED1}$, $V_{ED2}$). When operating in the interim operable state, the emitter module control circuit 436 may be configured to return to the normal state in response to detecting that the measured operating characteristics are once again within the acceptable range. In addition, in response to detecting persistent out-of-range measurements while in the interim operable state, the emitter module control circuit 436 may be configured to transition to an inoperable state during which the failed emitter and/or all of the emitters 411-414 may be turned off.

Figure 5:
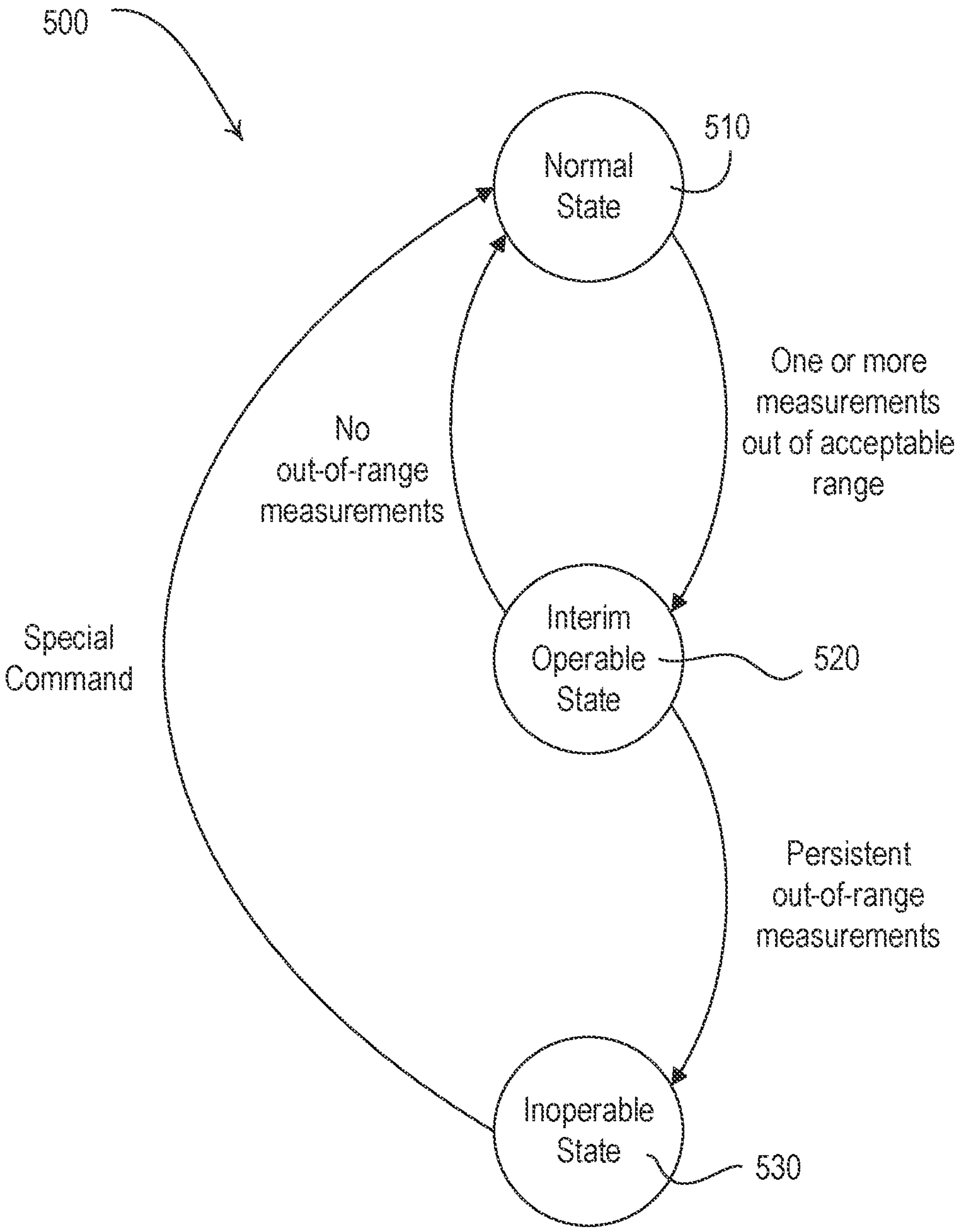
FIG. 5 is an example state diagram illustrating transitions between a normal state, an interim operable state, and an inoperable state of a lighting device.

FIG. 5 is an example state diagram 500 illustrating how an emitter module control circuit of a lighting device (e.g., the emitter module control circuit 436 of the lighting device 400) may change between a normal state 510 (e.g., an operable state), an interim operable state 520, and an inoperable state 530. For example, the emitter module control circuit may be configured to periodically execute a control procedure 600 (FIG. 6) to determine when to transition between the normal state 510, the interim operable state 520, and the inoperable state 530 for each of the emitters (e.g., each chain of emitters). When the measured operating characteristics of the lighting device 400 are within an acceptable range, the emitter module control circuit 436 may operate in the normal state 510 during which the emitter module control circuit 436 may control the drive currents $I_{LED1}$-$I_{LED4}$ to control the brightness (e.g., the luminous flux) and/or the color (e.g., the color temperature) of the cumulative light emitted by the lighting device 400. In the normal state 510, the emitter module control circuit 436 may control the drive currents $I_{LED1}$-$I_{LED4}$ in response to the respective luminous flux $L_E$ (e.g., as determined from the optical feedback signals $V_{FB1}$, $V_{FB2}$), and the respective forward voltage of each of the emitters 411-414 (e.g., as determined from the emitter forward-voltage feedback signals $V_{FE1}$-$V_{FE4}$).

When operating in the normal state 510, the emitter module control circuit 436 may measure (e.g., periodically measure) one or more of the operating characteristics of each of the emitters 411-414 and determine if the emitter module control circuit 436 should operate in the interim operable state 520. The emitter module control circuit 436 may determine that the emitter module control circuit 436 should operate in the interim operable state for one of the emitters 411-414 if the measurements of the operational characteristics for that emitter are outside of the acceptable range. For example, the emitter module control circuit 436 may determine that one or more measurements for one of the emitters 411-414 are outside of the acceptable range by comparing the value of the measured operational characteristic to a correlation value (e.g., such as another measured value and/or a calibration value).

For example, the emitter module control circuit 436 may begin to operate in the interim operable state 520 if the forward voltage of one of the emitters 411-414 is outside of the acceptable range, which may indicate that the emitter has failed. The emitter module control circuit 436 may compare a present measurement of the forward voltage of each of the emitters 411-414 (e.g., as determined from the respective emitter forward-voltage feedback signals $V_{FE1}$-$V_{FE4}$) to a present measurement of the forward voltage of one or each of the detectors 416, 418 (e.g., as determined from the respective detector forward-voltage feedback signals $V_{FD1}$, $V_{FD2}$). For example, the emitter module control circuit 436 may record a present measurement of the forward voltage of one of the emitters 411-414 and a present measurement of the forward voltage of one of the detectors 416, 418 during the same measurement interval. If the difference between the present measurement of the forward voltage of one of the emitters 411-414 and the present measurement of the forward voltage of one of the detectors 416, 418 is greater than a tolerance (e.g., a threshold), the emitter module control circuit 436 may operate in the interim operable state 520 for that emitter. In addition, the emitter module control circuit 436 may determine to operate in the interim operable state 520 by comparing the present measurement of the forward voltage of each of the emitters 411-414 to a calibration value (e.g., that may be retrieved from the calibration values stored in the memory 446 and then adjusted for the present drive current and temperature of the respective emitter). Further, the emitter module control circuit 436 may determine to operate in the interim operable state 520 by comparing the luminous flux $L_E$ (e.g., as determined from the optical feedback signals $V_{FB1}$, $V_{FB2}$) and/or the forward voltage of the detectors 416, 418 (e.g., as determined from the respective detector forward-voltage feedback signals $V_{FD1}$, $V_{FD2}$) to one or more other measured values and/or calibration values.

The emitter module control circuit 436 may determine to operate in the interim operable state 520 in response to detecting one or more out-of-range measurements of a particular operational characteristic. For example, in response to determining that a single measurement of the forward voltage of one of the emitters 411-414 is out of the acceptable range, the emitter module control circuit 436 may begin to operate in the interim operable state 520. In addition, the emitter module control circuit 436 may begin to operate in the interim operable state 520 in response to determining that a plurality of the measurements of the forward voltage of one of the emitters 411-414 are out of the acceptable range, such as a majority of measurements occurring within a time period.

Upon entering the interim operable state 520, the emitter module control circuit 436 may be configured to send a signal indicating that the emitter module control circuit 436 is operating in the interim operable state 520 to the light source control circuit 440 via the communication bus 442. The light source control circuit 440 may be configured to store an indication of the interim operable state 520 in the memory 446. In addition, the light source control circuit 440 may be configured to transmit a message including an indication of the interim operable state 520 for the lighting device 400 via the communication circuit 444.

When operating in the interim operable state 520, the emitter module control circuit 436 may alter the manner in which the drive currents $I_{LED1}$-$I_{LED4}$ for the respective emitters 411-414 are adjusted in response to the various feedback signals. For example, in the interim operable state 520, the emitter module control circuit 436 may not adjust the drive current $I_{LED1}$-$I_{LED4}$ of one or more of the emitters 411-414 (e.g., a failed emitter or potentially-failed emitter) in response to the measured luminous flux $L_E$ (e.g., as determined from the respective optical feedback signal $V_{FB1}$, $V_{FB2}$) and the forward voltage of the emitter (e.g., as determined from the respective emitter forward-voltage feedback signal $V_{FE1}$-$V_{FE4}$). While in the interim operable state 520, the emitter module control circuit 436 may be configured to derive the forward voltage of the failed emitter 411-414 from the forward voltage of one of the detectors 416, 418 (e.g., as determined from the detector forward-voltage feedback signals $V_{FD1}$, $V_{FD2}$). The emitter module control circuit 436 may be configured to adjust the respective drive current $I_{LED1}$-$I_{LED4}$ for the failed emitter 411-414 in response to the forward voltage of the respective detector 416, 418 when operating in the interim operable state 520.

While certain deleterious fluctuations of luminous flux of the light emitted by one or more of the emitters 411-414 in the normal state 510 may be attributed to failure of the emitters, there are instances in which deleterious fluctuations may occur due to other conditions (e.g., environmental conditions). For example, temporary corruption of the feedback signals (e.g., due to noise), unacceptable disturbances or fluctuations in the source voltage, and/or other environmental conditions may cause the light emitted by the lighting device 400 to exhibit undesirable characteristics (e.g., the brightness of the light may strobe or flicker and/or the color of the light may change). These fluctuations due to conditions other than emitter failure may also cause the emitter module control circuit 436 to enter the interim operable state 520. The emitter module control circuit 436 may not be able to determine whether the current disturbance is the result of a sudden failure of that emitter or the effect of a deleterious environmental condition change.

Accordingly, while operating in the interim operable state 520, the emitter module control circuit 436 may be configured to continue to monitor (e.g., periodically monitor) the forward voltages of the emitters 411-414 that caused the emitter module control circuit 436 to enter the interim operable state 520. The emitter module control circuit 436 may be configured to return to the normal state 510 in response to detecting numerous measurements of the forward voltages of the emitters 411-414 that are within the acceptable range. The emitter module control circuit 436 may be configured to enter the inoperable state 530 in response to continuing to detect measurements of the forward voltages of the emitters 411-414 that are outside of the acceptable range.

The emitter module control circuit 436 may measure (e.g., periodically measure) the forward voltages of the emitters 411-414 and maintain a counter to monitor the number of measurements of the forward voltages that are outside of the acceptable range as compared to the number of measurements of the forward voltages that are within the acceptable range. For example, in response to detecting measurements of the forward voltage of one of the emitters 411-414 that are outside of the acceptable range when operating in the interim operable state 520, the emitter module control circuit 436 may increase the counter by a first count value (e.g., a bad emitter count value). In response to detecting measurements of the forward voltage of one of the emitters 411-414 that are within the acceptable range, the emitter module control circuit 436 may decrease the counter by a second count value (e.g., a good emitter count value). If the counter exceeds a fail threshold, the emitter module control circuit 436 may be configured to enter the inoperable state 530. If the counter drops back down to zero, the emitter module control circuit 436 may be configured to return to the normal state 510. For example, the bad emitter count value may be greater than the good emitter count value, such that a smaller number of out-of-range measurements of the forward voltages of the emitters 411-414 may cause the emitter module control circuit 436 to remain in the interim operable state 520 for a longer period of time and/or cause the emitter module control circuit 436 to enter the inoperable state 530 sooner. In addition, a large number of measurements of the forward voltages of the emitters 411-414 that are within the acceptable range may be required (e.g., without many out-of-range measurements) in order to cause the emitter module control circuit 436 to return to the normal state 510.

The emitter module control circuit 436 may also be configured to determine an amount of time that the emitter module control circuit 436 has been operating in the interim operable state 520 to determine when and if to transition to the normal state 510 or the inoperable state 530. For example, if many (e.g., all) of the measurements of the forward voltages of the emitters 411-414 within a recover time period are within the acceptable range, the emitter module control circuit 436 may return to the normal state 510. If the emitter module control circuit 436 continues to receive out-of-range measurements of the forward voltages of the emitters 411-414 for a failure time period while in the interim operable state 520, the emitter module control circuit 436 may enter the inoperable state 530. In addition, the emitter module control circuit 436 may be configured to return to the normal mode 510 in response to a reset of the emitter module control circuit 436 and/or a power cycle to the lighting device 400.

If the emitter module control circuit 436 continues to detect out-of-range measurements while in the interim operable state 520, the emitter module control circuit 436 may transition to the inoperable state 530. In the inoperable state, the emitter module control circuit 436 may turn the emitters 411-414 off, such that no light is emitted by the lighting device 400. The emitter module control circuit 436 may be configured to exit the inoperable state 530 to return to the normal state 510 in response to receiving a special command, e.g., from the light source control circuit 440 via the communication bus 442. For example, the light source control circuit 440 may be configured to transmit the special command for exiting the inoperable state 530 to the emitter module control circuit 436 in response to receiving a message from an external device via the communication circuit 444.

Figure 6:
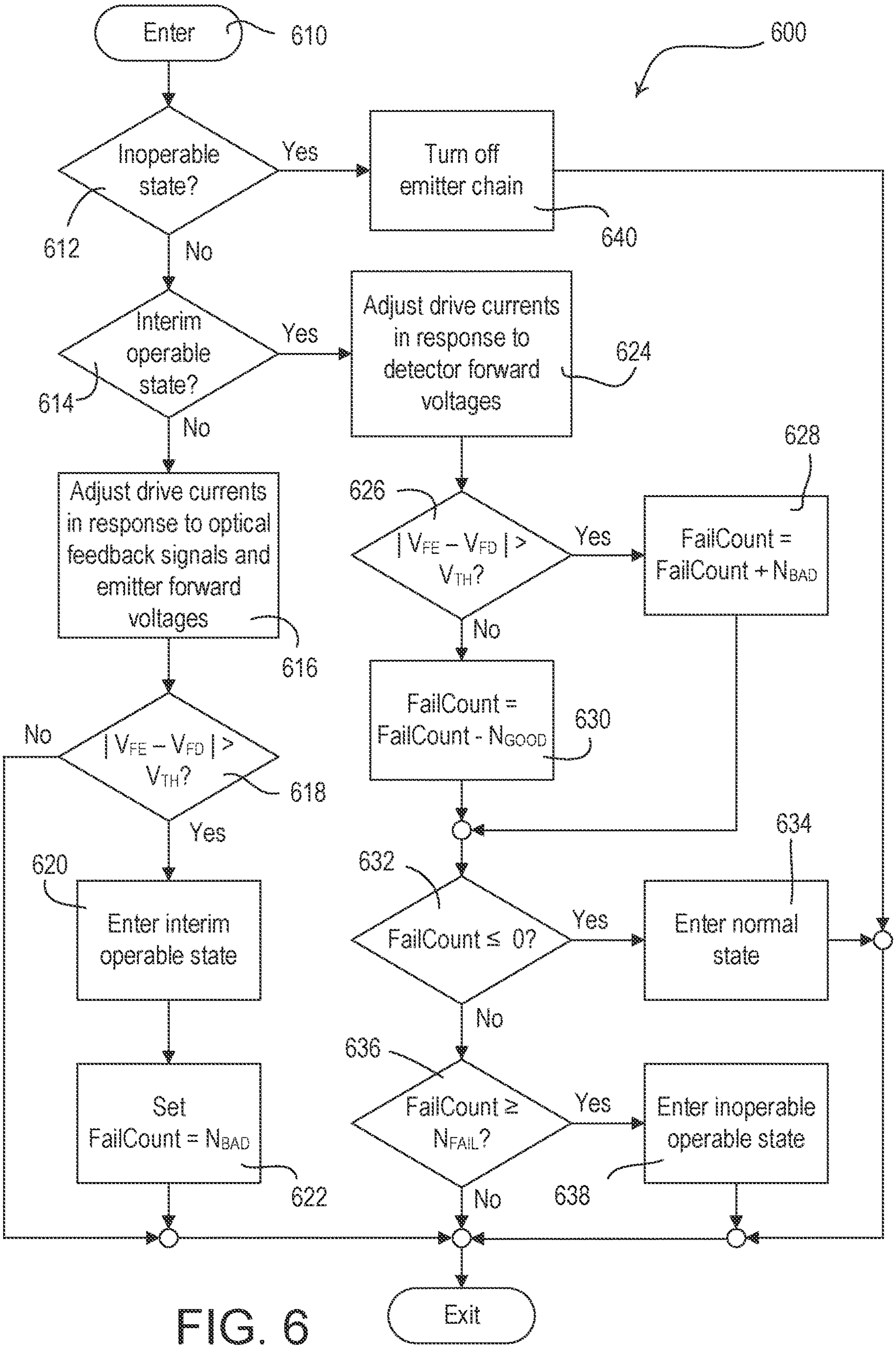
FIG. 6 is a simplified flowchart of an example control procedure for transitioning between multiple states of a lighting device.

FIG. 6 is a simplified flowchart of an example control procedure 600 that may be executed by a control circuit of a light source (e.g., the emitter module control circuit 436 of the lighting device 400). The light source may comprise a plurality of different emitters (e.g., chains of emitters). For example, the control circuit may be configured to periodically execute the control procedure 600 for each of the emitters (e.g., each chain of emitters) to determine when to transition between a normal state, an interim operable state, and an inoperable state for that emitter or emitter chain. The control procedure 600 may begin at 610. If the control circuit is not operating in the inoperable state at 612 and is not operating in the interim operable state at 614 (e.g., the control circuit is operating in the normal state of the present emitter or emitter chain), the control circuit may adjust the drive current conducted through the emitter in response to the luminous flux of the emitter (e.g., as determined from the respective optical feedback signal $V_{FB1}$, $V_{FB2}$) and the forward voltage $V_{FE}$ of the emitter (e.g., as determined from the respective emitter forward-voltage feedback signal $V_{FE1}$-$V_{FE4}$) at 616. If the difference between the present measurement of the forward voltage $V_{FE}$ of the emitter and the present measurement of the forward voltage $V_{FD}$ of one of a number of detectors of the light source (e.g., as determined from the respective detector forward-voltage feedback signal $V_{FD1}$, $V_{FD2}$) is greater than a threshold $V_{TH}$ (e.g., a tolerance) at 618, the control circuit may be configured to enter the interim operable state at 620 and set a counter FailCount to an initial value $N_{INIT}$ at 622, before the control procedure exits. For example, the initial value $N_{INIT}$ may be equal to a bad count value $N_{BAD}$ (e.g., 100) since the forward voltage $V_{FE}$ of the emitter was out of range of the forward voltage $V_{FD}$ of the detector at 618.

When the control circuit is operating in the interim operable state at 614, the control circuit may be configured to adjust the drive current conducted through the emitter in response to the forward voltage $V_{FD}$ of one of the detectors (e.g., as determined from the respective detector forward-voltage feedback signal $V_{FD1}$, $V_{FD2}$) at 624 (e.g., not in response to the luminous flux of the emitter or the forward voltage $V_{FE}$ of the emitter). The control circuit may be configured to continue to monitor the forward voltage $V_{FE}$ of the emitter at 626 in the interim operable state. If the difference between the present measurement of the forward voltage $V_{FE}$ of the emitter and the present measurement of the forward voltage $V_{FD}$ of the detector is greater than the threshold $V_{TH}$ at 626, the control circuit may increase the counter FailCount by the bad count value $N_{BAD}$ (e.g., 100) at 628. If the difference between the present measurement of the forward voltage $V_{FE}$ of the emitter and the present measurement of the forward voltage $V_{FD}$ of the detector is less than (e.g., less than or equal to) the threshold $V_{TH}$ at 626, the control circuit may decrease the counter FailCount by a good count value $N_{GOOD}$ (e.g., 1) at 630. After adjusting the counter FailCount at 628 or 630, the control circuit may determine if the counter FailCount has been reduced to zero at 632. If the counter FailCount is less than or equal to zero at 632, the control circuit may return to the normal state at 634 and the control procedure 600 may exit. If the counter FailCount is greater than zero at 632, and is greater than or equal to a failure threshold $N_{FAIL}$ at 636, the control circuit may enter the inoperable state at 638, before the control procedure 600 exits. When the control circuit is operating in the inoperable state at 612, the control circuit may turn off the emitter (e.g., the chain of emitters) at 640, and the control procedure 600 may exit.

Figure 7:
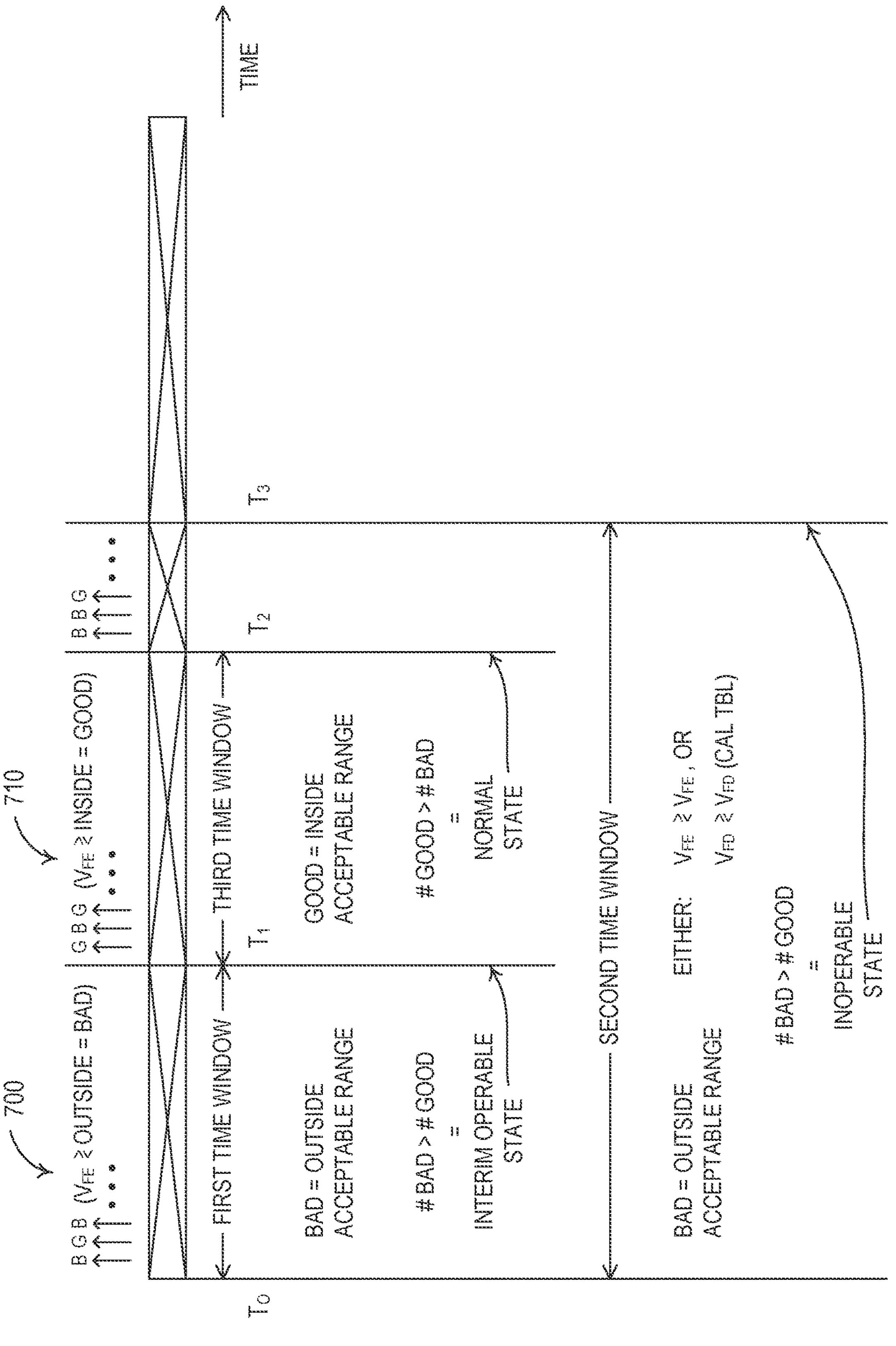
FIG. 7 is an example timing diagram illustrating various time windows for determining a state in which a lighting device may be placed.

FIG. 7 is a timing diagram illustrating various time windows (e.g., predetermined first, second and third time windows) for determining a state in which a lighting device (e.g., the lighting device 400) may be placed. For example, the lighting device may be place in a normal state, an interim operable state, or an inoperable state depending on a comparison between a forward voltage $V_{FE}$ of one of the emitters of the lighting device and a forward voltage $V_{FD}$ of one of the detectors of the lighting device (e.g., as shown in FIG. 5). For example, as shown in FIG. 7, the forward voltage $V_{FE}$ of the emitter is compared to the forward voltage $V_{FD}$ of the detector to determine if the forward voltage $V_{FE}$ of the emitter is outside of an acceptable range and, if so, at each time the measurement and comparison occurs within each corresponding measurement period a bad or good reading 700 results. If the acceptable range is exceeded, then a bad reading occurs (e.g., noted as "B" in FIG. 7). Each time the forward voltage $V_{FE}$ of the emitter is within an acceptable range relative to the forward voltage $V_{FD}$ of the detector, then a good reading occurs (e.g., noted as "G" in FIG. 7). If the number of bad readings is greater than the number of good readings across a plurality of measurement periods for the duration of the first time window that encompasses the plurality of measurement periods, then the lighting device enters the interim operable state. For example, the interim operable state may be entered at time $T_1$ as shown in FIG. 7.

During the first time window, illumination nonetheless continues while in the interim operable state, either from the compensated emitter or a substituted detector, and further measurements are taken during measurement periods 710 throughout a third time window. If those measurements indicate more good readings (i.e., inside the acceptable range) than bad readings, and preferably more good than bad readings for more than 80% of the readings or 80% of the third time window, for example, then at time $T_2$, the lighting device enters the normal emitter state.

However, if the number of forward voltage skews of the emitter relative to the detector at the various measurement periods throughout a second time window, or the number of forward voltage skews of the detector relative to the target forward voltage of the detector (read from a calibration table through the various measurement periods throughout the second time window) indicates more than a majority of bad readings compared to good readings for that detector throughout the second time interval, then the lighting device enters the inoperable state at time $T_3$.

The third time window is appended to the end of the first time window, and if the number of good readings exceeds the number of bad readings, then at the end of the third time window the lighting device can be returned to its normal state. Also, while in the interim operable state, the emitters are compensated even though unstable, or detectors can be substituted for the unstable emitters to nonetheless continue operating the lighting device rather than turning it, or one or more emitters within the illumination device, off. It is not until at the end of a second time window, much longer in duration than the first and third time windows, need a determination be made to turn off the emitter(s), possibly due to a catastrophic failure of that emitter, or the deleterious long term environmental changes occurring beyond a historical normal duration.

It will be appreciated to those skilled in the art having the benefit of this disclosure that the illumination device described herein is believed to provide improved operation by allowing a lighting device to continue emitting illumination even though one or more emitters within that lighting device may be unstable in its output. The benefit of an interim operable state also allows for return to a normal operating state if the emitter output (as determined by forward voltage comparisons) returns to an acceptable range, thereby preventing turning off one or more emitters pending their possible return to normal operation. It is yet a further benefit for stalling turning off emitters until it is of sufficient time lapse when emitter forward voltage skew and/or detector forward voltage skew exceeds a time duration much longer than both a time window needed to enter an interim operable state as well as an appended time window needed to possibly return to a normal state. The additional time duration proves beneficial in waiting enough time before actually turning the unstable emitter(s) off. Further modifications and alternative embodiments and various aspects of the illumination device described herein will be apparent to those skilled in the art in view of this description. It is intended, therefore, that the following claims be interpreted to embrace all such modifications and changes and, accordingly, the specification and drawings are to be regarded in an illustrative rather than a restrictive sense.

The preceding description of various aspects of an illumination device and a method for controlling an illumination device is not to be construed in any way as limiting the subject matter of the appended claims. In summary, a method is provided herein for controlling an illumination device. The illumination device may comprise at least one LED emitter and at least one LED detector. The method for controlling the illumination device begins with applying respective drive currents to the one or more emitters to produce illumination. If the emitters are configured in a plurality of chains, then separate drive currents can be applied to each chain of that plurality of emitters. For example, if one chain is to emit a particular spectral wavelength relative to another chain, then separate drive currents can be applied to each chain of the illumination device.

At relatively equal spaced intervals during illumination, measurements can be taken. During those periodic measurements, a forward voltage is measured across each emitter to determine a corresponding plurality of emitter forward voltages. For example, the forward voltages can be determined for one emitter within a chain separate and apart from other emitters in other chains, or all emitters in each chain can undergo measurement of their forward voltages. In addition to measuring forward voltages across the anode and cathode of select emitters or all emitters within the illumination device, one or more detectors can also be measured to determine their corresponding forward voltages. Alternatively, the forward voltages of a detector can be read from memory of the illumination device having that detector. A controller accesses the memory of the corresponding illumination device to read the corresponding detector forward voltage that was determined during an earlier calibration period and not during the periodic measuring period interspersed during illumination. As opposed to reading from a calibration table established before illumination, the forward voltage of a corresponding detector can be measured during the measuring period interspersed within illumination, and the detector forward voltage can be compared to the measured emitter forward voltage to determine forward voltage skewing.

If the emitter forward voltage compared to a corresponding detector forward voltage is outside an acceptable range throughout a first time window, then the illumination device is placed in an interim operable state. While in the interim operable state, the step of applying drive currents to respective emitters, and the periodically measuring or readings steps are maintained such that, to an observer, the emitters can still maintain their normal operation, yet the emitters are nonetheless generating an optical and electrical outputs that is unstable. When in the interim operable state, that appears to a user that the emitter(s) are outputting a somewhat normal optical and electrical output, an unstable state indicator signal can be sent in any fashion that is readable by a user either over a network or directly from that illumination device. Other than sending that unstable state indicator, the emitters nonetheless remain operable and send their somewhat, or within 80% of a normal range, for example, illumination values (brightness, color point chromaticity and color temperature).

If the emitter forward voltages relative to a corresponding detector forward voltage remains outside the acceptable range beyond the first time window and throughout a second time window that subsumes and extends beyond the first time window, then the illumination device transitions from the interim operable state to an inoperable state and the emitters are turned off. Thus, at the end of the second time window, the emitter forward voltages relative to the corresponding detector forward voltages have corresponding skews beyond an inappropriate time. As such, the step of applying drive currents for each of the plurality of emitters is discontinued. An inoperable state indicator signal is sent noting which of the emitters have an inappropriate skew from which of the respective detectors for an inappropriate time beyond the first time window and at the end of the second time window.

According to another aspect, a method is provided for controlling an illumination device comprising an LED emitter and an LED detector. The method comprises, at equal timed intervals between when the emitter is producing illumination, comparing a forward voltage across the emitter to a forward voltage across the detector. If the emitter forward voltage is inside the acceptable range relative to the detector forward voltage for at least a majority of a third time window appended at the end of the first time window, then the illumination device is placed back into its normal operating state. For example, if the emitter forward voltage is outside the acceptable range relative to the detector forward voltage for a majority of the first time window, and subsequently reverts back inside the first predetermined amount relative to the detector forward voltage for a majority of the third time window after the first predetermined time, then the illumination device returns back to the normal operating state. If the emitter forward voltage is outside the acceptable range relative to the detector forward voltage for a majority of the first time window and for a majority of the second time window that ends after the end of the first time window, then the illumination device deactivates that emitter.

As noted above, when in the interim operable state, an unstable state indicator is sent, similar to a token, to memory of the corresponding illumination device, as a wired or wireless signal to a remote control device, or across a network of coupled illumination devices to, for example, a keypad or wireless controller that is coupled to the network via a router, bridge or gateway. As with the unstable state indicator signal, the inoperable state indicator signal can also be sent to memory of the corresponding illumination device, as a wireless or wired signal across a network, and/or to a keypad or remote controller.

In order to maintain what would appear to be a normal illumination even though a faulty output has been detected on one or more emitters, as compared to detector forward voltages, when in the interim operable state, the faulty output possibly caused by environmental conditions can be corrected at the end of each measurement period through compensation. The compensation occurs by overdriving or under driving the emitter or emitters that have improper forward voltage skews relative to detector forward voltages as read in the previous measurement period.

Accordingly, at each measurement period interspersed at regular, substantially equal intervals within the illumination, drive currents can be reduced to a known drive current and forward voltages can be measured on the emitters and detectors. If improper skewing occurs over an improper number of measurement cycles, for example, a majority of those measurement cycles throughout the first predetermined time that subsumes multiple measurement cycles, then the illumination device enters the interim operable state. In the illumination periods between measurement periods, feedback compensation can occur. Feedback compensation entails comparing the measured forward voltage at a fixed drive current to what the forward voltage of that emitter should be for that drive current within a calibration table and under driving or over driving at the start of each illumination period to make up the difference. While overdriving or underdriving emitters at periodic intervals between measurement periods can cause flicker as seen by a user, flicker nonetheless can be tolerable for short periods of time rather than simply turning the emitters off. Therefore, measurements are needed to determine if an interim operable state can nonetheless occur. Yet those measurements can also allow for periodic, and regular illumination compensation to continue somewhat normal operation output yet with periodic flicker as seen by a user. In some instances, it is more desirable to continue emitter operation in the interim operable state, even though flicker can occur, rather than simply turning the emitter or emitters off and entering directly into an inoperable state.

The interim operable state proves beneficial when faulty emitter output is temporary or spurious, caused by spurious environmental condition fluctuations rather than actual failure of the emitter. For example, an emitter can be structurally and functionally sound, yet power supplied via the AC mains can be temporarily disrupted such as what might happen in a "brown out." Rather than entering an inoperable state and turning the good emitters off, it may prove more beneficial to maintain their operation in the interim operable state showing possibly some flicker. In the first time window, compensation can be invoked to overdrive or underdrive the good emitter or emitters possibly causing flicker yet the emitters remain on, provided the faulty output caused by the spurious environmental conditions does not extend past, for example, a second time window that is longer than the first time window. If the faulty output extends past the second time window, then it may be determined that the fault is not with the environmental conditions but instead is with the emitter(s) themselves. Thus, the first time window is sufficient to indicate fault in the emitter output caused by environmental conditions, whereas the second time window (much longer than the first time window) is sufficient to determine fault in the emitters themselves. Setting the second time window is based on historical data of how long environmental condition disruptions normally last. For example, if environmental disruptions, such as AC main brownout, flashes, shifting edge triggering and other environmentally created glitches normally last no more than three seconds, then a first time window can be set less than three seconds (e.g., two seconds) and the second time window can be set greater than three seconds, but preferably no more than twice the first time window.

If, in the interim, the environmental glitches cease within the third time window but before the end of the second time window, then the illumination device can return to its normal emitter state, with forward voltages between each of the emitters and each of the corresponding detectors being within the acceptable range for a majority of the measurement cycles between the end of the first time window and the end of the second time window.

According to yet a further aspect, an illumination device is provided. The illumination device comprises an LED emitter and an LED detector. A processor is coupled to periodically compare at substantially equal timed intervals between when the emitter is producing illumination, and that comparison occurs between the emitter forward voltage and the detector forward voltage. The illumination device further comprises a memory coupled to the processor for storing a predetermined acceptable range, a first time window, a second time window, and a third time window. When read by the processor at the equal timed intervals, the processor generates an unstable state indicator signal while maintaining illumination from the emitter if the emitter forward voltage is outside the acceptable range relative to the detector forward voltage for a majority of the first time window. The processor, when reading from the memory at the equal time interval, also generates an inoperable state indicator and deactivates illumination from the emitter after the second time window if the emitter forward voltage remains outside the acceptable range relative to the detector forward voltage for a majority of the second time window.

Instead of utilizing the emitter to produce illumination during the interim operable state via comparison to a calibration table and, through feedback, overdriving or underdriving that emitter, the emitter can be replaced by a detector. Detectors are also LEDs, similar to emitters, and a detector having the same spectral wavelength output can replace an emitter. Therefore, when comparing the forward voltages of an emitter to a detector, the detector should be one which has the same color output as the emitter and, if called upon, can be used to replace the emitter by gating off the emitter and the processor gating on the corresponding detector and driving the detector similar to an emitter without necessarily needing to overdrive or underdrive via compensation.

The concepts described herein are not limited to any particular type of illumination device, any particular number of modules that may be included within an illumination device, or any particular number, color, or arrangement of emitters and detectors included within a module. Instead, the illumination device described herein need only include at least one module comprising at least one emitter, possibly arranged in one or more chains of emitters, and at least one detector either arranged in a correspondingly similar color chain of emitters or separate from the chain(s). In some embodiments, a dedicated detector may not be required, if one or more of the emitters is configured, at times, to provide photodetector functionality.

What is claimed is:

1. A lighting device, comprising:

a drive circuit operatively couplable to at least one emitter;

a measurement circuit to measure an operating parameter of the at least one emitter; and a control circuit communicatively coupled to the drive circuit and to the measurement circuit, the control circuit to place the lighting device in one of a plurality of operating states, the control circuit configured to:

cause the drive circuit to adjust a drive parameter of the at least one emitter;

receive the data representative of the operating parameter of the at least one emitter from the measurement circuit; and determine the operating state of the lighting device using at least one of: the drive parameter of the at least one emitter or the operating parameter of the at least one emitter;

wherein the plurality of lighting device operating states includes: a NORMAL state, an INTERIM state, and an INOPERABLE state.

2. The lighting device of claim 1 wherein to cause the drive circuit to adjust an emitter drive parameter, the control circuit to further:

cause the drive circuit to adjust a drive current provided to the at least one emitter.

3. The lighting device of claim 2 wherein to receive the data representative of the operating parameter of the at least one emitter, the control circuit to further:

receive data representative of a forward voltage measured across at least one photodetector based on the output of the at least one emitter.

4. The lighting device of claim 3 wherein to determine the operating state of the lighting device, the control circuitry to:

determine a forward voltage across the at least one emitter based on the adjusted drive current;

calculate a difference between the forward voltage across the at least one emitter and the forward voltage across the photodetector; and determine whether the calculated difference between the forward voltage across the at least one emitter and the forward voltage across the photodetector exceeds a defined threshold value.

5. The lighting device of claim 4 wherein to determine the operating state of the lighting device, the control circuitry to further:

cause the lighting device to enter the INTERIM state responsive to the calculated difference between the forward voltage across the emitter and the forward voltage across the photodetector exceeding the defined threshold value, otherwise cause the lighting device to enter the NORMAL state.

6. The lighting device of claim 5 wherein responsive to determine the operating state a determination that the lighting device should be placed in the INTERIM state, the control circuit to:

increment a failure counter;

cause the drive circuit to provide an adjusted drive current to the at least one emitter using the data representative of the forward voltage across the photodetector;

calculate a second difference between the forward voltage across the at least one emitter at the adjusted drive current and the forward voltage across the photodetector; and determine whether the second difference exceeds the defined threshold value; and responsive to the determination that the second difference exceeds the defined threshold value:

increment the failure counter;

determine whether the failure counter exceeds a defined failure count threshold value; and cause the lighting device to enter the INOPERATIVE state responsive to the determination that the failure counter exceeds the defined failure count threshold value.

7. The lighting device of claim 5 wherein responsive to the second difference not exceeding the defined threshold value, the control circuit to further:

decrement the failure counter;

determine whether the failure counter is less than zero; and cause the lighting device to enter the NORMAL state responsive to the determination that the failure counter is less than zero.

8. A method of determining an operating state of a lighting device that includes a drive circuit coupled to at least one emitter, a measurement circuit, and a control circuit, the method comprising:

causing, by the control circuit, the drive circuit to set a drive parameter of the at least one emitter;

receiving, by the control circuit from the measurement circuit, data representative of an operating parameter of the at least one emitter; and determining, by the control circuit, the operating state of the lighting device using at least one of: the drive parameter of the at least one emitter or the operating parameter of the at least one emitter;

wherein the plurality of lighting device operating states includes: a NORMAL state, an INTERIM state, and an INOPERABLE state.

9. The method of claim 8 wherein causing the drive circuit to set the emitter drive parameter further comprises:

causing, by the control circuit, the drive circuit to adjust a drive current provided to the at least one emitter.

10. The method of claim 9 wherein receiving the data representative of the operating parameter of the at least one emitter further comprises:

receiving, by the control circuit from the measurement circuit, data representative of a forward voltage measured across at least one photodetector based on the output of the at least one emitter.

11. The method of claim 10 wherein determining the operating state of the lighting device further comprises:

determining, by the control circuit, a forward voltage across the at least one emitter based on the adjusted drive current;

calculating, by the control circuit, a difference between the forward voltage across the at least one emitter and the forward voltage across the photodetector; and determining, by the control circuit, whether the calculated difference between the forward voltage across the at least one emitter and the forward voltage across the photodetector exceeds a defined threshold value.

12. The method of claim 11 wherein determining the operating state of the lighting device further comprises:

causing, by the control circuit, the lighting device to enter the INTERIM state responsive to the calculated difference between the forward voltage across the emitter and the forward voltage across the photodetector exceeding the defined threshold value, otherwise place the lighting device in the NORMAL state.

13. The method of claim 12, further comprising:

responsive to the determination that the lighting device should be placed in the INTERIM state:

incrementing, by the control circuit, a failure counter;

causing, by the control circuit, the drive circuit to provide an adjusted drive current to the at least one emitter using the data representative of the forward voltage across the photodetector;

calculating, by the control circuit, a second difference between the forward voltage across the at least one emitter at the adjusted drive current and the forward voltage across the photodetector; and determining, by the control circuit, whether the second difference exceeds the defined threshold value; and responsive to the determination that the second difference exceeds the defined threshold value:

incrementing, by the control circuit, the failure counter;

determining, by the control circuit, whether the failure counter exceeds a defined failure count threshold value; and causing by the control circuit, the lighting fixture to enter the INOPERATIVE state responsive to the determination that the failure counter exceeds the defined failure count threshold value.

14. The method of claim 12, further comprising:

responsive to the determination that the second difference does not exceed the defined threshold value:

decrementing, by the control circuit, the failure counter;

determining, by the control circuit, whether the failure counter is less than zero; and causing, by the control circuit, the lighting device to enter the NORMAL state responsive to the determination that the failure counter is less than zero.

15. A non-transitory, machine-readable, storage device that includes instructions that, when executed by a lighting device control circuit, causes the control circuit to:

cause an operatively coupled drive circuit to set a drive parameter of at least one emitter operatively coupled to the drive circuit;

receive from a measurement circuit, data representative of an operating parameter of the at least one emitter; and determine the operating state of the lighting device using at least one of: the drive parameter of the at least one emitter or the operating parameter of the at least one emitter;

wherein the plurality of lighting device operating states includes: a NORMAL state, an INTERIM state, and an INOPERABLE state.

16. The non-transitory, machine-readable, storage device of claim 15 wherein the instructions that cause the lighting device control circuit to cause the drive circuit to set the emitter drive parameter further cause the control circuit to:

cause the drive circuit to adjust a drive current provided to the at least one emitter.

17. The non-transitory, machine-readable, storage device of claim 16 wherein the instructions that cause the lighting device control circuit to receive the data representative of the operating parameter of the at least one emitter further cause the control circuit to:

receive, from the measurement circuit, data representative of a forward voltage measured across at least one photodetector based on the output of the at least one emitter.

18. The non-transitory, machine-readable, storage device of claim 17 wherein the instructions that cause the lighting device control circuit to determine the operating state of the lighting device further cause the control circuit to:

determine a forward voltage across the at least one emitter based on the adjusted drive current;

calculate a difference between the forward voltage across the at least one emitter and the forward voltage across the photodetector; and determine whether the calculated difference between the forward voltage across the at least one emitter and the forward voltage across the photodetector exceeds a defined threshold value.

19. The non-transitory, machine-readable, storage device of claim 18 wherein the instructions that cause the lighting device control circuit to determine the operating state of the lighting device further cause the control circuit to:

cause the lighting device to enter the INTERIM state responsive to the calculated difference between the forward voltage across the emitter and the forward voltage across the photodetector exceeding the defined threshold value, otherwise place the lighting device in the NORMAL state.

20. The non-transitory, machine-readable, storage device of claim 19 wherein the instructions, when executed by the lighting device control circuit further cause the control circuit to, responsive to the determination that the lighting device should be placed in the INTERIM state:

increment a failure counter;

cause the drive circuit to provide an adjusted drive current to the at least one emitter using the data representative of the forward voltage across the photodetector;

calculate a second difference between the forward voltage across the at least one emitter at the adjusted drive current and the forward voltage across the photodetector; and determine whether the second difference exceeds the defined threshold value; and responsive to the determination that the second difference exceeds the defined threshold value:

increment the failure counter;

determine whether the failure counter exceeds a defined failure count threshold value; and cause the lighting fixture to enter the INOPERATIVE state responsive to the determination that the failure counter exceeds the defined failure count threshold value.

21. The non-transitory, machine-readable, storage device of claim 19 wherein the instructions, when executed by the lighting device control circuit further cause the control circuit to, responsive to the determination that the second difference does not exceed the defined threshold value:

decrement the failure counter;

determine whether the failure counter is less than zero; and cause the lighting device to enter the NORMAL state responsive to the determination that the failure counter is less than zero.

* * * * *